(12) United States Patent
Larsen

(10) Patent No.: US 10,507,808 B2
(45) Date of Patent: Dec. 17, 2019

(54) SYSTEM FOR PREVENTING A TRAILER'S OVERRUN BRAKES FROM BEING ACTIVATED DURING REVERSING

(71) Applicant: SVELA SOLUTIONS AS, Fredrikstad (NO)

(72) Inventor: Sverre Egil Larsen, Fredrikstad (NO)

(73) Assignee: SVELA SOLUTIONS AS, Fredrikstad (NO)

( * ) Notice: Subject to any disclaimer, the term of this patent is extended or adjusted under 35 U.S.C. 154(b) by 0 days.

(21) Appl. No.: 15/700,870

(22) Filed: Sep. 11, 2017

(65) Prior Publication Data

US 2019/0077383 A1   Mar. 14, 2019

(51) Int. Cl.
| *B60T 7/20* | (2006.01) |
| *B60T 11/28* | (2006.01) |
| *B60T 11/10* | (2006.01) |
| *B60T 13/08* | (2006.01) |

(52) U.S. Cl.
CPC .............. *B60T 7/206* (2013.01); *B60T 7/203* (2013.01); *B60T 11/107* (2013.01); *B60T 11/28* (2013.01); *B60T 13/08* (2013.01)

(58) Field of Classification Search
CPC ........ B60T 11/107; B60T 11/108; B60T 7/20; B60T 7/203; B60T 13/08; F16F 9/029; F16F 9/0218; F16F 9/0263; F16F 9/0272; B60D 1/30; B60D 1/322
USPC ....................................... 188/112 R
See application file for complete search history.

(56) References Cited

U.S. PATENT DOCUMENTS

| 2,571,323 | A | * | 10/1951 | Yoder | ................. B60T 7/20 |
| | | | | | 188/112 R |
| 2,969,857 | A | | 1/1961 | Parkhurst | |
| 3,505,815 | A | * | 4/1970 | Wherry | ................. B60D 1/065 |
| | | | | | 188/112 R |
| 3,765,623 | A | | 10/1973 | Donelson et al. | |
| 3,880,263 | A | * | 4/1975 | Ewald | ................. B60T 11/107 |
| | | | | | 188/112 R |
| 4,153,143 | A | * | 5/1979 | DePuydt | ............ B60T 11/107 |
| | | | | | 188/112 R |
| 4,249,643 | A | * | 2/1981 | Yoder | ................ B60T 11/107 |
| | | | | | 188/112 R |

(Continued)

FOREIGN PATENT DOCUMENTS

| DE | 3440679 A1 | * | 5/1985 | ............ B60T 7/20 |
| GB | 1 341 724 A | | 12/1973 | |
| GB | 2 385 102 A | | 8/2003 | |

*Primary Examiner* — Bradley T King
*Assistant Examiner* — Stephen M Bowes
(74) *Attorney, Agent, or Firm* — Sughrue Mion, PLLC

(57) ABSTRACT

A overrun brake system includes a gas spring with a gastight cylinder and a piston with holes allowing gas to slip through so that the pressure is the same on both sides. Since the free end of the piston has a larger area than the side where the piston rod is located, the gas spring will act as a compression spring. To prevent the overrun brakes from being activated during reversing, the gas spring has a solenoid controlled valve receiving current from the reverse light circuit and closing the flow of gas through the piston when the towing unit's gear is set into reverse. When the gear is set into forward position the solenoid loses its current and a mechanical return spring opens the valve, so that the overrun brakes may act normally again.

10 Claims, 4 Drawing Sheets

(56) References Cited

U.S. PATENT DOCUMENTS

| | | | | |
|---|---|---|---|---|
| 4,402,523 A | * | 9/1983 | Knowles | B60D 1/242 |
| | | | | 188/112 A |
| 5,232,271 A | | 8/1993 | Cobble et al. | |
| 6,126,246 A | * | 10/2000 | Decker, Sr. | B60T 17/223 |
| | | | | 188/112 R |
| 6,375,211 B1 | * | 4/2002 | MacKarvich | B60D 1/32 |
| | | | | 188/112 R |
| 2007/0267258 A1 | * | 11/2007 | Massmann | F16F 9/0245 |
| | | | | 188/316 |
| 2015/0105975 A1 | * | 4/2015 | Dunn | B60D 1/322 |
| | | | | 701/36 |

\* cited by examiner

SYSTEM FOR PREVENTING A TRAILER'S OVERRUN BRAKES FROM BEING ACTIVATED DURING REVERSING

FIELD OF THE INVENTION

The present invention relates to a system preventing a trailer's overrun brakes from being activated during reversing.

BACKGROUND

Currently there exist several different types of braking systems for car trailers, but for trailers with a total weight up to 3500 kg, overrun brakes are the most common. When a car with attached trailer is braking, the trailer will be pressed against the tow bar of the car and the retardation force will be absorbed by the trailer's ball hitch attachment which is mounted on a slide. This retardation force will move the slide, which transfers the force and movement to the trailer's brake system via mechanical rods and wires or via a hydraulic system. There are also brake systems which are driven by electricity or compressed air.

In order to have the brake force transmitted gradually to the brakes and preventing the wheels from being locked, most trailers with overrun brakes have a gas spring acting as a shock absorber on the slide. This gas spring is also pushing the slide out again after each braking sequence Mechanical overrun brakes, which is most commonly used in Europe, has a mechanical overrun device and transferring of brake forces to drum brakes via rods and cables. These are simple constructions and work well during forward driving, but they have a great problem in that the brakes are also activated during reversing. Several different systems have been designed to limit or prevent the braking effect during reversing, but they all have various shortcomings and unwanted features.

Currently most trailer manufacturers in Europe are using the German "Rücknnatic" or similar systems, which make the brake shoes release some of the pressure against the drums when wheels are rotating backwards. These systems make reversing heavy because the brakes are not deactivated 100% and if not maintained and adjusted correctly backing up may be impossible because of locked wheels.

Another unwanted and dangerous feature with these systems is that the hand brake only works when trailer is rolled forward. This means the trailer cannot be parked with front end uphill without putting backstops behind the wheels.

When heavy boats are rolled on/off boat trailers in steep ramps accidents have happened repeatedly because of sudden loss of brake force. With Rücknnatic and similar systems the hand brake will only keep wheels locked up to a certain point of torque, when gravity is pulling a trailer backwards. When gravity force exceeds the braking torque of the hand brake, the brake shoes are losing grip the same way as during reversing and the wheels will suddenly start rolling backwards.

To prevent the braking effect 100% when reversing with overrun brakes, a lot of mechanical solutions for locking up the slide has been made over the past years.

As an example, a spring-loaded steel lever is manually put into a slot before reversing and when driving forward again the spring pushes the lever aside and the slide is free to move again. This solution incurs a safety risk as it may fasten in the locked position due to insufficient lubrication and maintenance. In addition, this is a mechanical device where the user must get out of the car to activate manually, as opposed to the inventive system which may be activated automatically when the gearchange lever is put into reverse.

Other known devices for preventing the braking effect during reversing with mechanical overrun brakes are for example patents GB1341724 and GB2385102. These are based on the principle of inserting a hydraulic cylinder with a piston as a part of the brake rod. A solenoid controlled valve may open or close for hydraulic fluid to pass from one side of the piston to the other. The principle here is that the piston shall be locked against a hydraulic pressure for the braking system to work during driving, and that this pressure ceases during reversing because a solenoid controlled valve is opened. A safety weakness of this principle is that the braking effect is reduced or ceases completely if a leak occurs in the hydraulic system of the cylinder.

Hydraulic overrun brakes, or surge brakes, which are more common in the USA, have also a gas spring mounted as a shock absorber in parallel with the master pump, but braking action during reversing is usually prevented by a solenoid controlled valve which closes the flow of hydraulic fluid from the master cylinder. Even though such hydraulic surge brake systems have solved the problem of braking effect during reversing, the master cylinder has to carry all the compressive force required to back the trailer. Backing a full loaded trailer up a steep hill may result in overloading of the master cylinder and the brakes may fail if the master cylinder or the hydraulic pipe/hose system should develop a leak.

SUMMARY OF THE INVENTION

It is an object of the present invention to provide a system preventing the activation of a trailer's overrun brakes during reversing, wherein the system will fully disconnect the brakes during reversing, the system preventing failures of the brake system.

This is achieved in a system according to the following claims.

BRIEF DESCRIPTION OF THE DRAWINGS

The invention will now be described in detail in reference to the attached drawings, in which.

The attached drawings are meant to be schematically showing the principal function of the invention's overrun brake system. Only a few examples of how the different components of the system may be combined are drawn, but the system is off course not limited to these examples. It is up to any trailer builder to find their own design.

To make this patent application as simple and transparent as possible, drawings of ordinary and well known drum and disc brakes and their transmission system like rods, Bowden cables, hydraulic network and description of how they work, are omitted.

DETAILED DESCRIPTION

Figure 1:
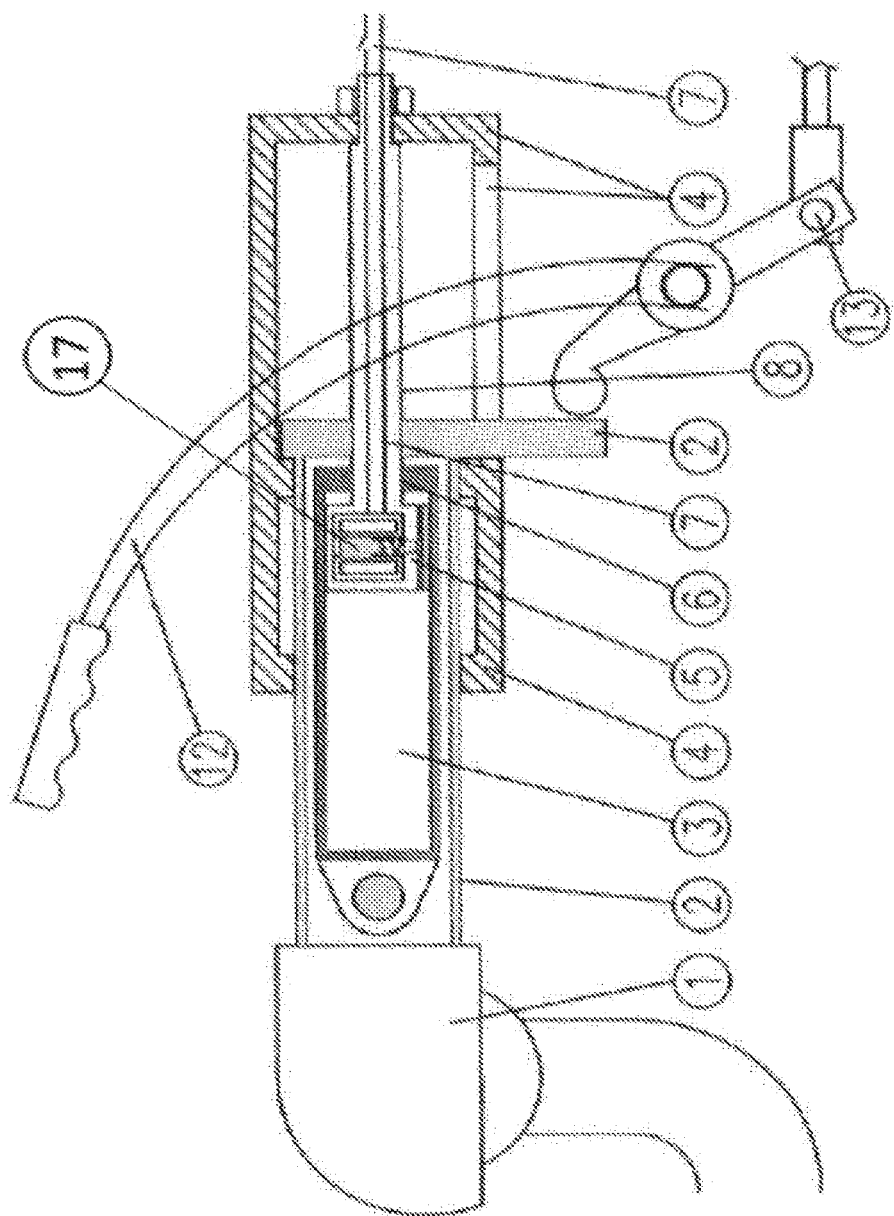
FIG. 1 shows a solenoid and valve that are included in the piston itself with current supplied through the piston rod.

FIG. 1 shows a trailer's hitch attachment connected to the ball of a vehicle's towbar. Between the coupling device 1

(release lever not shown) grabbing the ball and the trailer's drawbar there is a slide 2 allowing the coupling device 1 to be pressed towards the drawbar when the vehicle is braking. From the coupling device 1 there is a mechanical mechanism 13 transferring the forces to the brakes on each wheel. A hand brake lever 12 is connected to the mechanical transfer mechanism 13 allowing the trailer to be parked with the brakes activated. The slide 2 shown in the figure is of a tubular type and inside the slide there is mounted a gas spring 3. The gas spring 3 is fastened to the slide 2 in one end, while the other end is fastened to a fixed point on the trailer, here the end of the overrun device housing 4 which is a part of the drawbar. Thus, the gas spring is effectively connected in parallel with the slide.

The gas spring is built according to known principles as a closed cylinder with constant gas overpressure. A piston rod 8 is passing through a stuffing box/gland 6 in one end of the cylinder. A piston 5 is mounted on the piston rod 8 inside the cylinder, the piston 5 having openings allowing the gas to flow freely through holding the gas pressure constant on both sides of the piston.

Due to the piston rod 8 occupying a part of the piston's surface on one side, the opposite side of the piston will have a larger area affected by the constant gas pressure. The force affecting the open side of the piston will therefore constantly be larger than on the side where the piston rod is mounted, and thus the unit will work as a compression spring.

The invention's gas spring is made using the same principle but has in addition a solenoid controlled valve 17 coupled to the trailer's reversing light circuit or alternately from another electrical source. The other electrical source may be a dedicated switch for supplying power to the solenoid valve in trailers and vehicles without a normal reverse light circuit, such as an ATV. When the car is set into reverse, the solenoid is supplied with current from the trailer's reversing light circuit and the valve becomes closed. When gas cannot flow freely from one side to the other of the piston, the gas spring is locked.

If the slide of the ball hitch attachment is fully extended so that the trailer's brakes are not on when the car is set into reverse, the locked gas spring will prevent the slide from moving and thus the braking is fully inactivated during reversing.

When the car's gear is removed from the reverse position, the current to the reversing light is cut and the solenoid's mechanical return spring will open the valve again restoring normal braking function.

As a safety measure, an extra switch may be inserted in the backing light circuit to avoid any uncontrolled locking of the gas spring caused by possible failures in the backing light circuit when driving forward.

In the embodiment of the invention shown in FIG. 1 the solenoid valve 17 is incorporated in the piston 5 with the conductors 7 supplying current to the solenoid routed out through the piston rod 8.

Figure 2:
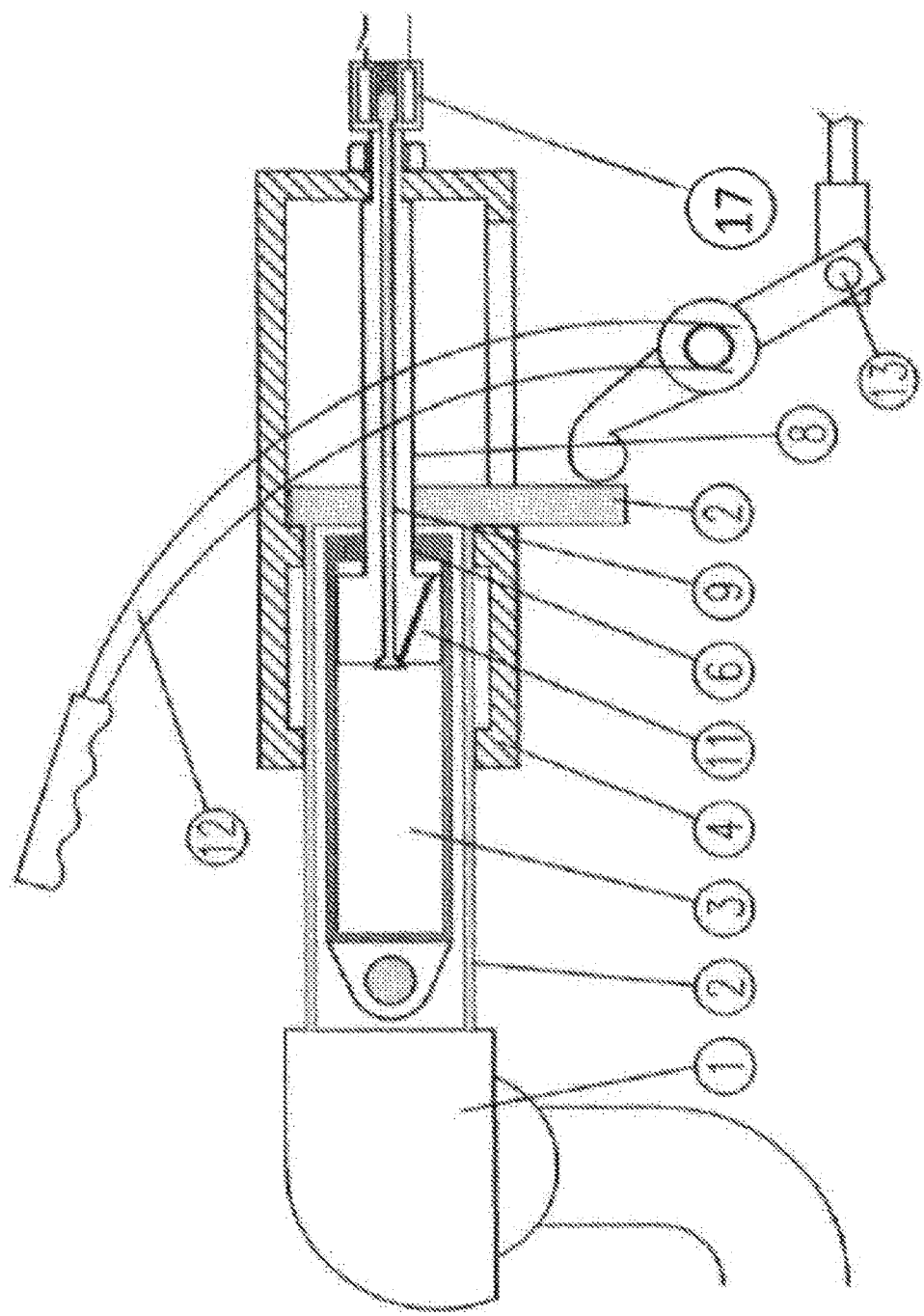
FIG. 2 shows a solenoid that is mounted outside the gas spring's cylinder with a pushrod to the valve in the piston.

FIG. 2 shows an embodiment where the solenoid itself is located external to the gas spring while the valve part is incorporated in the piston. A valve rod 9 is transferring the movement of the solenoid's pallet to the valve. The valve is opening/closing a number of channels 11 connecting the two sides of the piston.

Figure 3:
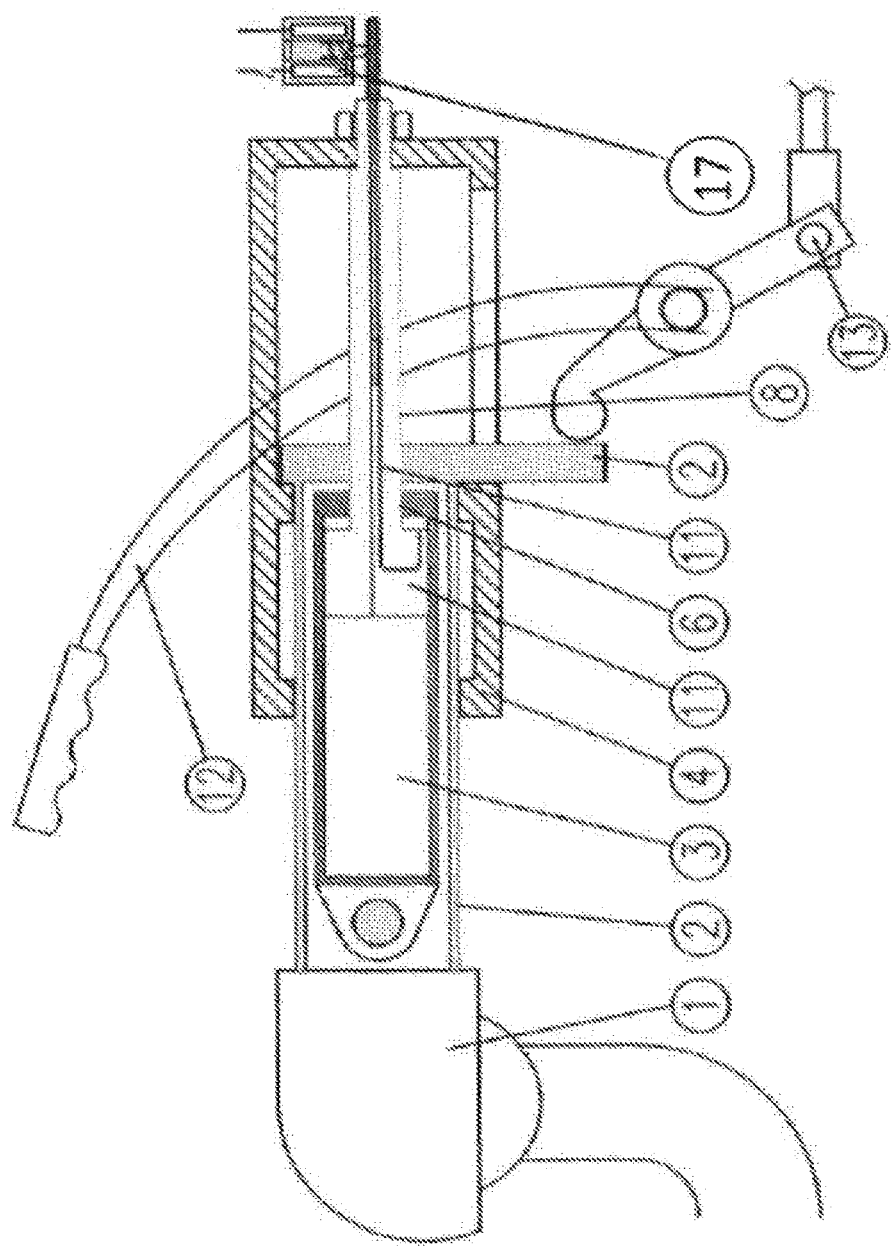
FIG. 3 shows a solenoid and valve built as a standalone unit, without any physical connection to the gas spring other than pipe or hose connection to both sides of the piston.

FIG. 3 shows an embodiment of the invention wherein the whole solenoid valve 17 is mounted externally to the gas spring. Channels 11 from each side of the piston are routed through the piston rod 8 out to the solenoid valve.

Figure 4:
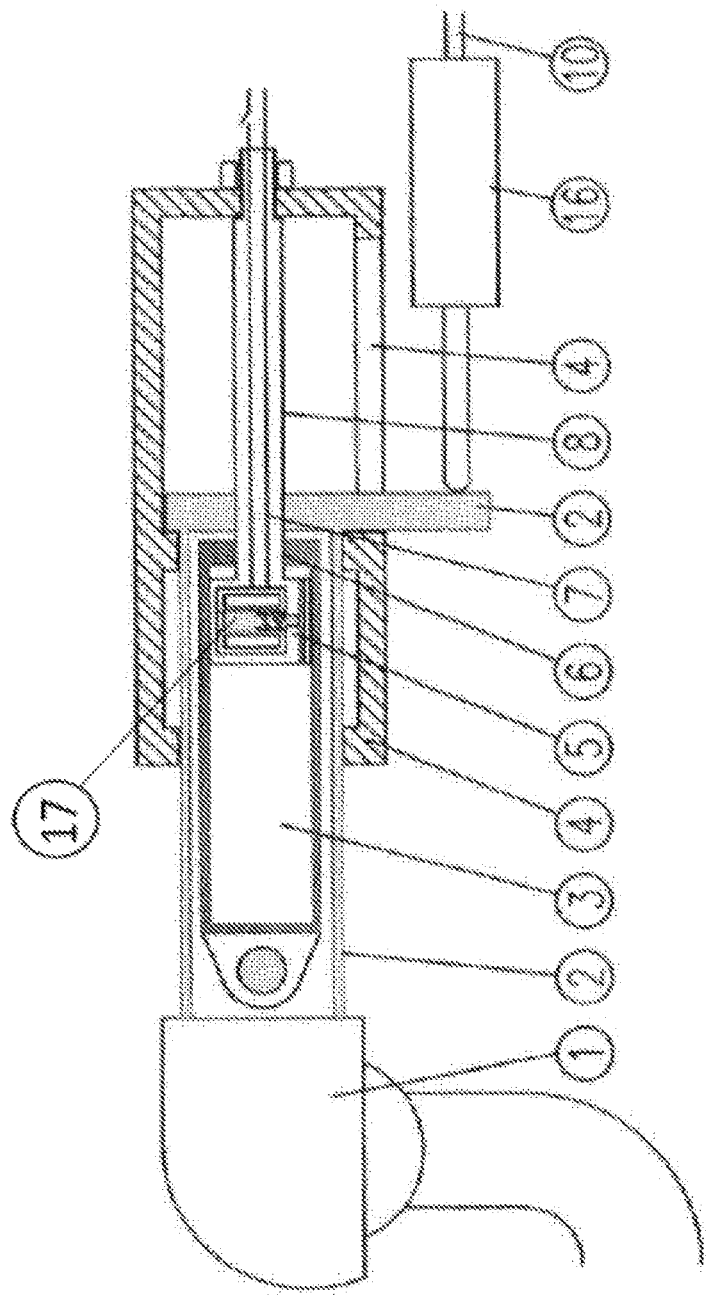
FIG. 4 shows schematically how the inventions overrun brake system with lockable gas spring may be used with hydraulic surge brakes.

FIG. 4 shows an embodiment of the invention with hydraulic transfer of the retardation forces to the brakes. The slide 2 is transferring the forces to a master cylinder 16 which is connected to the brakes (i.e. to slave cylinders in each wheel) via hydraulic lines 10.

Since the invention's gas spring with solenoid controlled valve always is mounted in parallel with the slide in mechanical overrun brakes and in parallel with the master pump in hydraulic surge brakes, the braking system will be 100% intact during driving whatever possible leaks occurring in the gas spring, solenoid controlled valve or their connections. The gas spring will only work as a shock absorber and returning spring during driving and as a pushrod during reversing. This relates to both mechanical and hydraulic overrun brakes.

In the case of hydraulic surge brakes, the lockable gas spring, which is mounted in parallel with the master cylinder, takes all compressing forces and leaves the master cylinder completely undepressurized. A leak in the lockable gas spring, however, will not affect the braking effect at all.

By using the inventive system with lockable gas spring, it is no need for Rücknnatic or similar brake systems and drum brakes with ordinary brake shoes may be used, providing full braking effect both forward and backward when using the hand brake.

An advantage of the invention is that trailers equipped with original gas springs as dampers may have these readily exchanged with the invention's lockable gas springs and get the same advantages regarding no activation of brakes when reversing.

The system with solenoid and valve closing and opening the flow of gas through or around the piston may be designed in several ways, but in the attached drawing only some alternatives are schematically shown as examples.

The invention claimed is:

1. An overrun brake system for a trailer, the system comprising:
    a coupling device adapted to connect the trailer to a towbar of a vehicle,
    a slide providing a first connection connecting the coupling device to a drawbar of the trailer and transferring retardation forces to brakes of the trailer,
    a gas spring providing a second connection connecting the slide to the drawbar in parallel with the first connection, the gas spring including a cylinder and a piston, the piston including two sides and at least one channel connecting the two sides, and
    a solenoid valve, the solenoid valve being electrically connected to and operated by an electric source, the solenoid valve being activated only when the vehicle is set in reverse, the solenoid valve being open and connecting the two sides of the piston so that gas passes from one of the two sides to another of the two sides via the at least one channel when the solenoid valve is non-energized, and the solenoid valve being closed and preventing gas from passing between the two sides of the piston when the solenoid valve is energized by the electric source.

2. The brake system according to claim 1, wherein the solenoid valve is incorporated in the piston.

3. The brake system according to claim 1, wherein a solenoid of the solenoid valve is mounted external to the gas spring, the valve of the solenoid valve is incorporated in the piston, the valve being operated by the solenoid by a valve rod running in the piston's piston rod.

4. The brake system according to claim 1, wherein the solenoid valve is mounted external to the gas spring, the at least one channel comprising a plurality of channels, at least one channel from each side of the piston leading to the solenoid valve through the piston's piston rod.

5. The brake system according to claim 1, wherein the slide is a tube slide and the gas spring is mounted inside the slide.

6. The brake system according to claim 1, further comprising a mechanical mechanism that transfers the retardation forces from the slide to the brakes of the trailer, said brakes including brake shoes that give full braking power regardless of the wheels' direction of rotation.

7. The brake system according to claim 1, the electric source is a switch or a reverse light circuit.

8. The brake system according to claim 1, wherein the electric source is a reverse light circuit of the vehicle.

9. The brake system according to claim 1, wherein the retarding forces are transferred from the coupling device to drum- or disc brakes via a mechanical system.

10. The brake system according to claim 1, wherein the retarding forces are transferred from the coupling device to drum- or disc brakes via a hydraulic system.

\* \* \* \* \*